United States Patent

Nakagawa et al.

[11] Patent Number: 5,454,088
[45] Date of Patent: Sep. 26, 1995

[54] MICROPROGRAM CONTROL DEVICE FOR CONTROLLING DATA PATH SECTION INCLUDING DESIGNATION OF INSTRUCTION CYCLE VALUES

[75] Inventors: Hiromasa Nakagawa; Tsunenori Umeki, both of Itami, Japan

[73] Assignee: Mitsubishi Denki Kabushiki Kaisha, Tokyo, Japan

[21] Appl. No.: 62,183

[22] Filed: May 17, 1993

Related U.S. Application Data

[63] Continuation-in-part of Ser. No. 963,024, Oct. 19, 1992, which is a continuation of Ser. No. 324,972, Mar. 20, 1989, abandoned, which is a continuation of Ser. No. 930,566, Nov. 14, 1986, abandoned.

[30] Foreign Application Priority Data

Nov. 15, 1985 [JP] Japan ................................. 60-257279

[51] Int. Cl.$^6$ ..................................... G06F 9/26
[52] U.S. Cl. ............. 395/375; 395/421.05; 364/DIG. 1; 364/244; 364/244.6; 364/255.1; 364/255.8; 364/262.4; 364/262.8
[58] Field of Search ..................................... 395/375, 400, 395/775, 800; 365/230.01, 230.06

[56] References Cited

U.S. PATENT DOCUMENTS 3,391,394  7/1968  Ottaway et al. .............. 364/DIG. 1 X
3,990,052  11/1976 Gruner .................................... 395/375
4,047,247  9/1977  Stanley et al. .......................... 395/400
4,370,709  1/1983  Fosdick .................................. 395/500
4,370,729  1/1983  Bosch .................................... 395/400
4,835,679  5/1989  Kida et al. ............................. 395/375

FOREIGN PATENT DOCUMENTS 0110227  11/1983  European Pat. Off. .
2099618  4/1982   United Kingdom .
2133189  12/1983  United Kingdom .

OTHER PUBLICATIONS

Strip Architecture fits microcomputer into less silicon by John Hayne.

*Primary Examiner*—Paul V. Kulik

[57] ABSTRACT

A microprogram control device controls a data path section provided in a CPU, which uses a microcode stored in a microprogram memory by using a microprogramming method. The control device includes an instruction register for storing an instruction code which is received from a data bus and an address generator for generating an address signal to access the microprogram memory, from the output of the instruction register. The address generator uses a first address decoder for decoding the type of the instruction from a particular bit in the instruction code and a second address decoder for decoding the addressing mode of the instruction from another particular bit of the instruction code. A third address decoder is included for designating the timing for accessing the microprogram memory at each cycle of the instruction.

8 Claims, 8 Drawing Sheets

MICROPROGRAM CONTROL DEVICE FOR CONTROLLING DATA PATH SECTION INCLUDING DESIGNATION OF INSTRUCTION CYCLE VALUES

This application is a continuation-in-part of U.S. patent application Ser. No. 07/963,024, filed on Oct. 19, 1992, now pending, which is a continuation of U.S. patent application Ser. No. 07/324,972, filed on Mar. 20, 1989, now abandoned, which is a continuation of U.S. patent application Ser. No. 06/930,566, filed on Nov. 14, 1986, now abandoned. The entire contents of each specification of these applications are incorporated herein.

FIELD OF THE PRESENT INVENTION

The present invention relates to a microprogram control device, and more particularly, to a microprogram control device in which the address designation from the microprogram ROM is generated by a successive address designating method is simplified by converting only the instruction cycle value of the successive address from the microprogram ROM.

BACKGROUND ART

Figure 3:
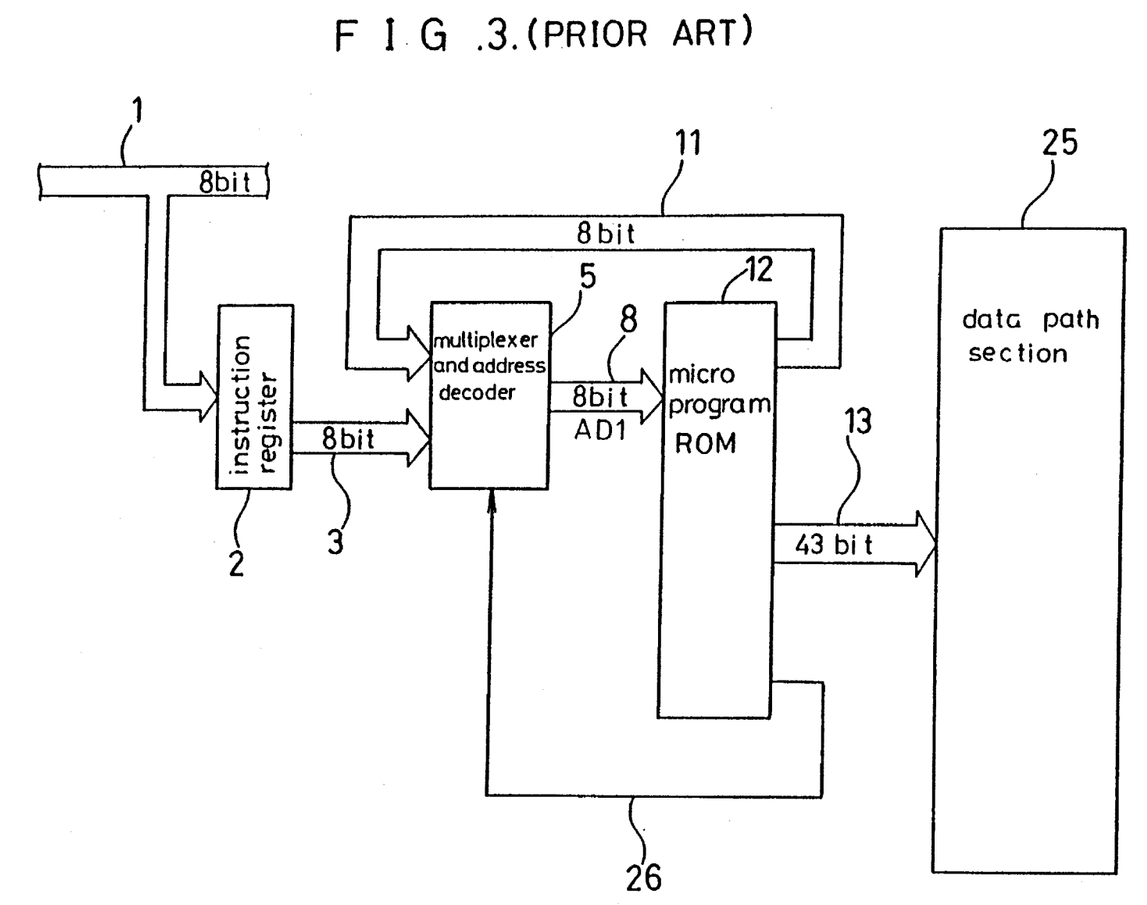
FIG. 3 is a block diagram showing the prior art successive addressing system microprogram control device.

FIG. 3 is a block diagram showing the microprogram control device of a computer using the conventional successive address designating method described in Electronics Jan. 27, 1981, pp. 107–111. This microprocessor is an eight bit microcomputer. In FIG. 3, reference numeral 1 designates an 8 bit data bus; reference numeral 2 designates an instruction register; and reference numeral 3 designates an address signal line for sending the content of the instruction register 2 to the multiplexer and address decoder 5. Reference numeral 8 designates an eight bit signal line to the microprogram ROM 12. Reference numeral 11 designates a successive address eight bit signal of the microprogram ROM 12 for the next cycle which is outputted from the microprogram ROM 12. Reference numeral 13 designates a forty-three bit control line between the data path section 25 and the microprogram ROM 12. Reference numeral 26 designates a selector signal line for controlling the multiplexer 5.

Figure 4:
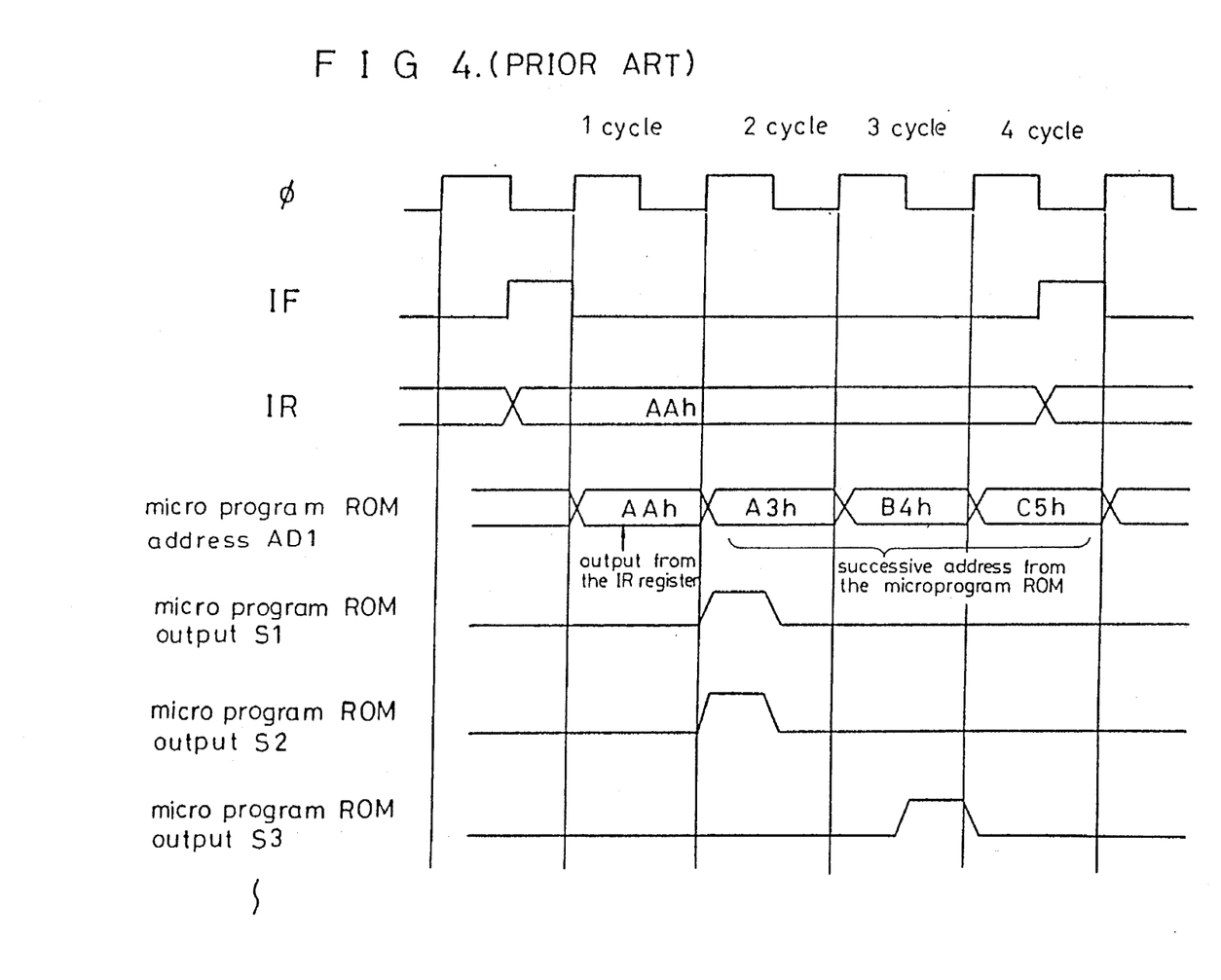
FIG. 4 is a timing chart for exemplifying the operation control device of FIG. 3.

FIG. 4 shows a timing chart of the operation of the microprogram control device of FIG. 3. In FIG. 4, reference character Ø designates a system clock; and reference character IF designates an instruction fetch signal for taking in the instruction code to the instruction register 2 from the data bus 1. Reference character IR designates the content of the instruction register 2 such as an operation code taken in from the data bus 1 by the IF. Reference character AD1 designates an address of the microprogram ROM, and this address has an eight bit width. Reference characters S1 to S3 designate the output of the microprogram ROM 12 for controlling the control line 13 of the data path section 25.

The operation of the microprogram control will be described with reference to FIGS. 3 and 4. The timing chart of FIG. 4 is for a case where an instruction (four cycle instruction) is executed by the microprogram control of FIG. 3. Suppose that the instruction code is a provisional instruction such as AAh (the h designates the hexadecimal representation).

In FIG. 4, when the IF signal is "H" an eight bit instruction code is taken into the instruction register 2 from the data bus 1. At the first cycle, the output from the successive address designating signal line 11 which is a portion of the microcode from the microprogram ROM 12 is taken into the multiplexer and address decoder 5 by the signal of the selector signal line 26, which signal is a portion of the same microcode. In this case, the content of the instruction register 2, that is, the eight bit instruction code becomes the address of the microprogram ROM 12 through the multiplexer 5 (AAh in FIG. 4), and it outputs a control signal to the data path section 25 in accordance with the microcode.

At the second cycle, as the address to be inputted to the microprogram ROM 12, the previous cycle eight bit successive address from the microprogram ROM 12 is obtained because the output of the multiplexer 5 is switched to that input in accordance with the selector signal 26. By this method it is possible to obtain a random value as the successive address.

In the successive cycles, the address output in the previous cycle is inputted to the microprogram ROM 12 to produce a successful control operation until the instruction is concluded. In FIG. 4, the address AD1, AAh→A3h→B4h→C5h, can be outputted in turn from the first cycle.

In such a prior art successive address designating system where the bit width of the instruction code falls in the eight bit class, control becomes impossible when the number of combinations of the control patterns (control lines of forty-three bit) for controlling the CPU becomes larger than 256.

Accordingly, in a case where a bit width of the instruction code of a microcontroller or microprocessor is larger than eight bits, for example, sixteen bits, it is quite ineffective to utilize an access method for the microprogram ROM 12 in which the successive address has a sixteen bit width which is similar to the prior art method of FIG. 3.

Furthermore, as the control pattern for controlling the data path section 25 grows to $2^{16}$ kinds of successive addresses that can be outputted, such a system would not be practical. The instruction code in the microcontroller or the microprocessor is often constituted by an instruction type designating bit; such as an operation instruction, a transfer instruction, or a jump instruction; or an addressing mode designating bit. When the instruction code width falls in the sixteen bit class, the instruction type and the addressing mode are used quite often, and an efficient performance by the prior art cannot be realized by utilizing the successive address designating method.

SUMMARY OF THE PRESENT INVENTION

An object of the present invention is to provide an improved microprogram control device wherein a successive address designating method for the microprogram ROM is simply realized in an integrated circuit even if the bit number of the instruction code and the bit number of the data bus control (the number of the control pattern) are increased.

Other objects and advantages of the present invention will become apparent from the detailed description given below. It should be understood, however, that the detailed description and specific embodiment are given by way of illustration only, since various changes and modifications within the spirit and scope of the invention will become apparent to those skilled in the art from this detailed description.

According to the present invention, there is provided a microprogram control device for controlling a data path section provided in a CPU, which utilizes a microcode stored in a microprogram memory. The microprogram control device includes an instruction register for storing an instruction code which is received from a data bus; an address generator for generating an address that enables accessing the microprogram memory from the output of the instruction register. The address generator includes a first address decoder for decoding an instruction type from the particular bit of the instruction code of the instruction register; a second address decoder for decoding the addressing mode of the instruction from another particular bit of the instruction code; and a third address decoder for designating a cycle value for accessing the microprogram memory for each cycle of the instruction.

DETAILED DESCRIPTION OF THE PREFERRED EMBODIMENTS

Figure 1:
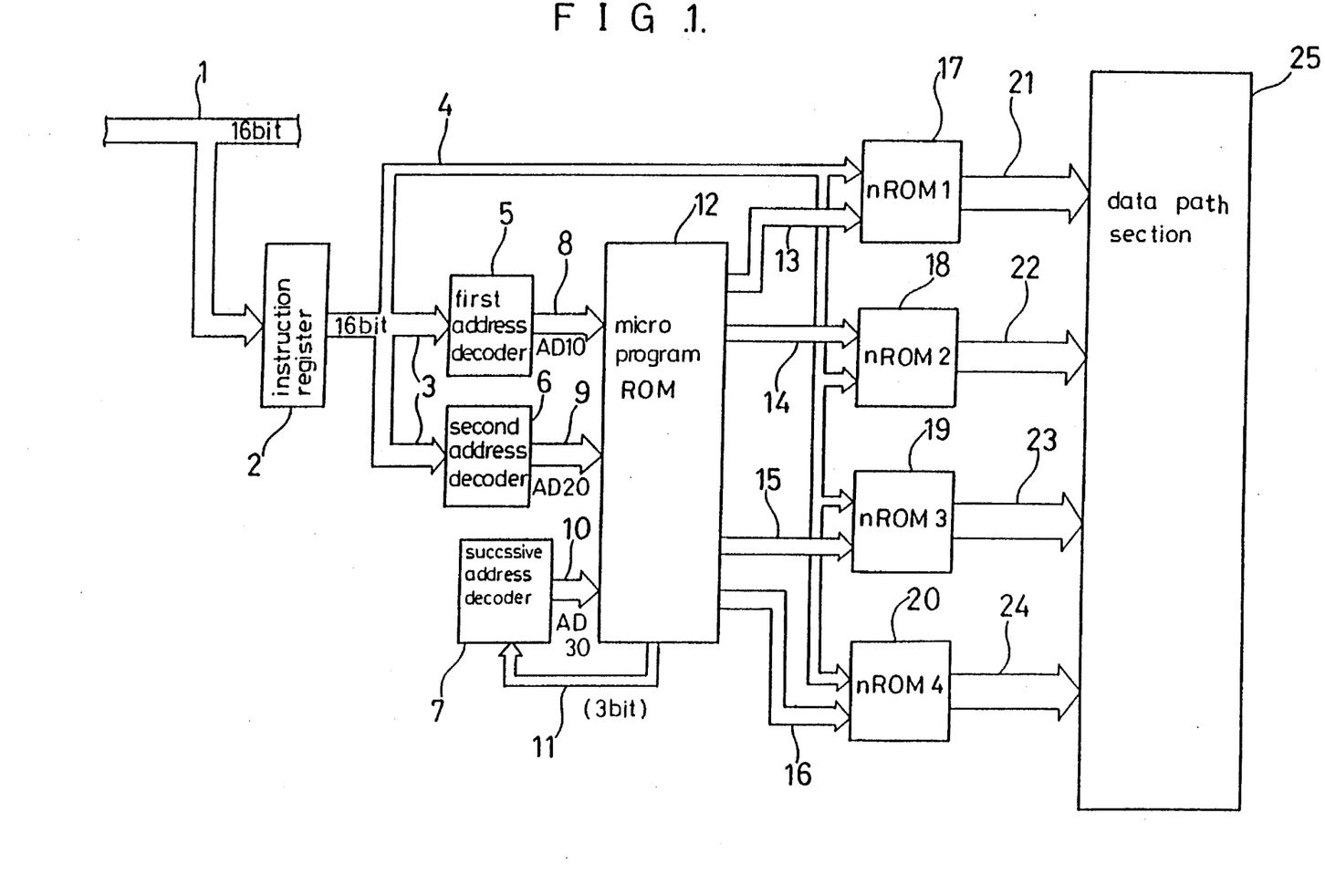
FIG. 1 is a block diagram showing a microprogram control device utilizing a successive addressing method as an embodiment of the present invention.

In order to explain the present invention in detail, reference will particularly be made to FIG. 1.

In FIG. 1, reference numeral 1 designates a data bus; reference numeral 2 designates an instruction register; reference numeral 12 designates a microprogram ROM; and reference numerals 5 and 6 designate a first and a second address decoder which receives the instruction code from the instruction register 2 and generates addresses for the microprogram ROM 12. Reference numerals 17 to 20 designate circuits for decoding the output microcode of the microprogram ROM 12 to generate each control bit on the data path section 25 (referred to as nano-program memory; nROM). Reference numerals 21 to 24 designate output signal lines from the nROM to the data path section 25. Reference numerals 13 to 16 designate output signal lines from the microprogram ROM 12 to the nROMs 17 to 20. Reference numeral 7 designates a decoder for receiving the output of the microprogram ROM 12 and designating, in the successive address, the cycle value of the instruction.

Furthermore, reference numeral 11 designates a successive address signal line from the microprogram ROM 12; and reference numerals 8 to 10 designate address output lines (AD10, AD20, AD30) from the address decoders 5 to 7 to the microprogram ROM 12. In this embodiment, the successive address designation is conducted by the address decoder 7. Reference numeral 4 designates a signal line for sending the instruction code from the instruction register 2 to the nROMs 17 to 20.

Figure 2:
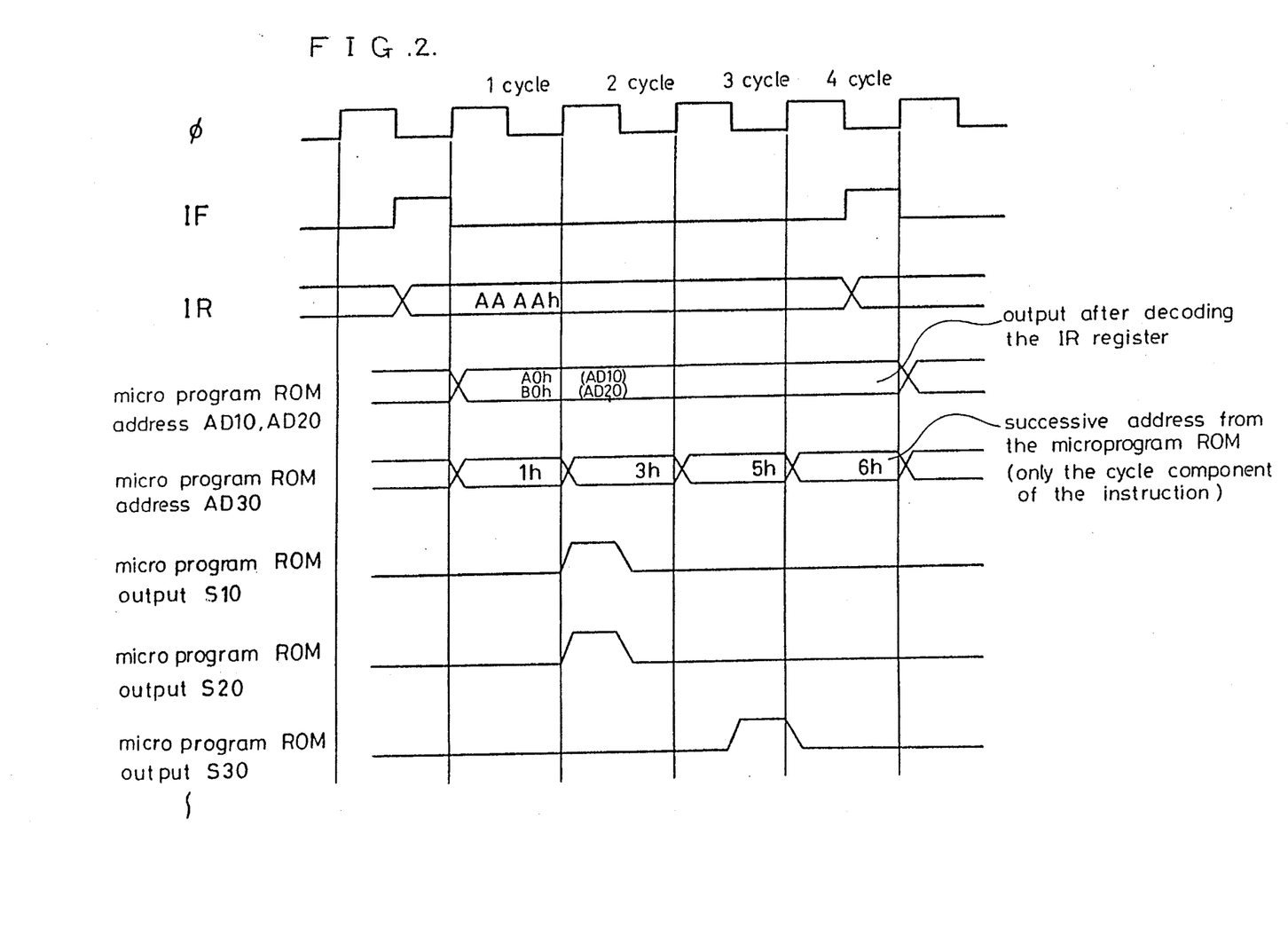
FIG. 2 is a timing chart for exemplifying the operation of the control device of FIG. 1.

Next, the operation of this microprogram control device will be described. FIG. 2 shows a time chart in executing an instruction (4 cycle instruction) as the microprogram control of FIG. 1. Suppose that the instruction code is a provisional instruction of AAAAh.

In FIG. 2, when the IF signal is high, a sixteen bit instruction code from the data bus 1 is received in the instruction register 2. At the next cycle, components relating to the instruction type and the addressing mode are extracted from the instruction code which is stored in the instruction register 2, and an address is generated for the microprogram ROM 12. In FIG. 2, the first cycle outputs are generated, for example, A0h and B0h. These values are held until the instruction is concluded. The first cycle address decoder 7 receives a microcode from the microprogram ROM 12 so as to enable the setting of the address at a cycle value (1h in FIG. 2) at which the instruction is started.

In the next cycles, that is, in the second, the third, and the fourth cycle, the successive addresses are outputted from a portion of the microprogram ROM 12, successively. For example, the successive addresses are 3h→5h→6h, as shown in FIG. 2. At each cycle, the output from the microprogram ROM 12 is sent to the nROMs 17 to 20, and these are combined with a bit of the instruction code from the instruction register 2 to generate a control signal to be sent to the data path section 25.

In this embodiment, the address input of the microprogram ROM comprises three components of an instruction type: an addressing mode, an instruction code, and an instruction cycle value outputted from the microprogram ROM. The addressing mode is separated from both the instruction code and the instruction cycle value. The successive address designation from the microprogram ROM is only conducted by the instruction cycle value. Accordingly, it is possible to prevent an increase in the number of bits in the microcodes for designating the successive addresses of the microprogram ROM even if the number of bits in the instruction codes of a microcomputer or microcontroller is increased when the successive address designating method is used. This results in that a microcomputer or microcontroller which utilizes the successive address designating method with an increased number of bits in the instruction codes is easily realized on integrated circuits.

Figure 5:
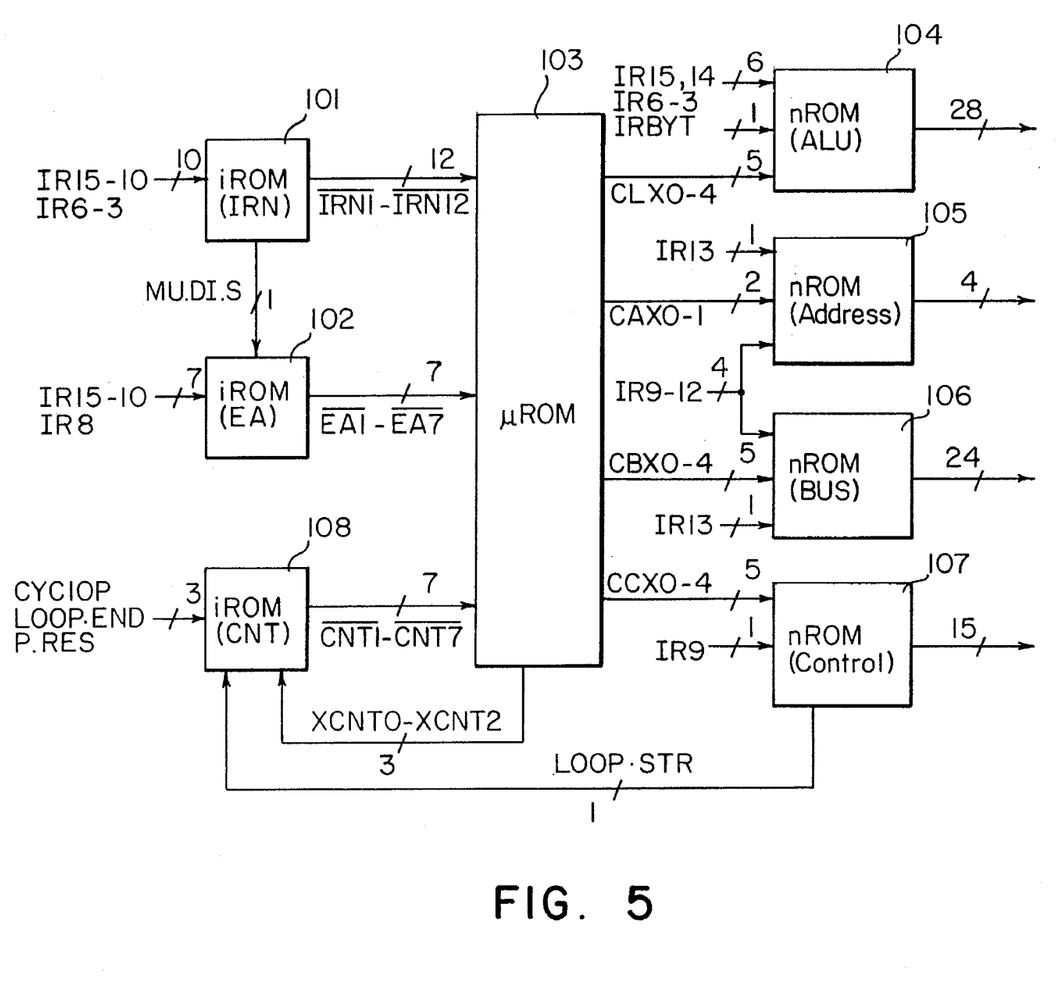
FIG. 5 is a detailed drawing of FIG. 1.

FIG. 5 illustrates a more detailed representation of the device illustrated in FIG. 1. In FIG. 5, item 101 represents a first read only memory (ROM) that corresponds to the first address decoder 5 of FIG. 1. This ROM 101 receives 10 bits from the instruction register and decodes these 10 bits to produce a 12 bit word to be inputted into the microprogram (ROM) 103. Item 102 is a second read only memory (ROM). This ROM 102 corresponds to the second address decode 6 of FIG. 1. The second ROM 102 receives 7 bits from the instruction register of FIG. 1, as well as, a control bit from the first ROM 101 which bits are then decoded to produce a 7 bit word to be inputted into the microprogram ROM 103. FIG. 5 also includes a third read only memory (ROM) 108 which corresponds to the third (successive) address decoder 7 of FIG. 1. This third ROM 108 receives a total of 7 bits of information which are decoded to produce a 7 bit word representing the cycle value for the instruction being decoded by the microprogram ROM 103.

Upon receiving the 12 bit data word from the first ROM 101, the 7 bit data word from the second ROM 102, and the 7 bit data word from the third ROM 108, the microprogram ROM 103 outputs a total of 20 bits of data information of which 3 bits are fed directly back into the third ROM 108, the third (successive) address decoder 7 of FIG. 1. Of the other 17 data bits, 5 data bits are fed into read only memory 104, 2 data bits are fed into read only memory 105, 5 data bits are fed into read only memory 106, and 5 data bits are fed into read only memory 107. The various read only memories (104–107) provide special instructions or code for use by the microprocessor. More specifically, read only memory 104 provides 28 bits of code for controlling the ALU of the microprocessor. Moreover, read only memory 105 outputs 4 bits of data to control the address functions of the microprocessor. Read only memory 106 outputs 24 bits for managing the data on the various buses of the microprocessor. Lastly, read only memory 107 outputs 15 bits of data which provide the timing signals and other control signals to be utilized by the microprocessor when performing the instruction outputted by the microprogram read only memory 103, the microcode. More specifically, read only memory 107 provides the data that controls the timing of the cycles and the accessing of data during the cycle for the various microsteps being processed to perform the inputted instruction.

Figure 6:
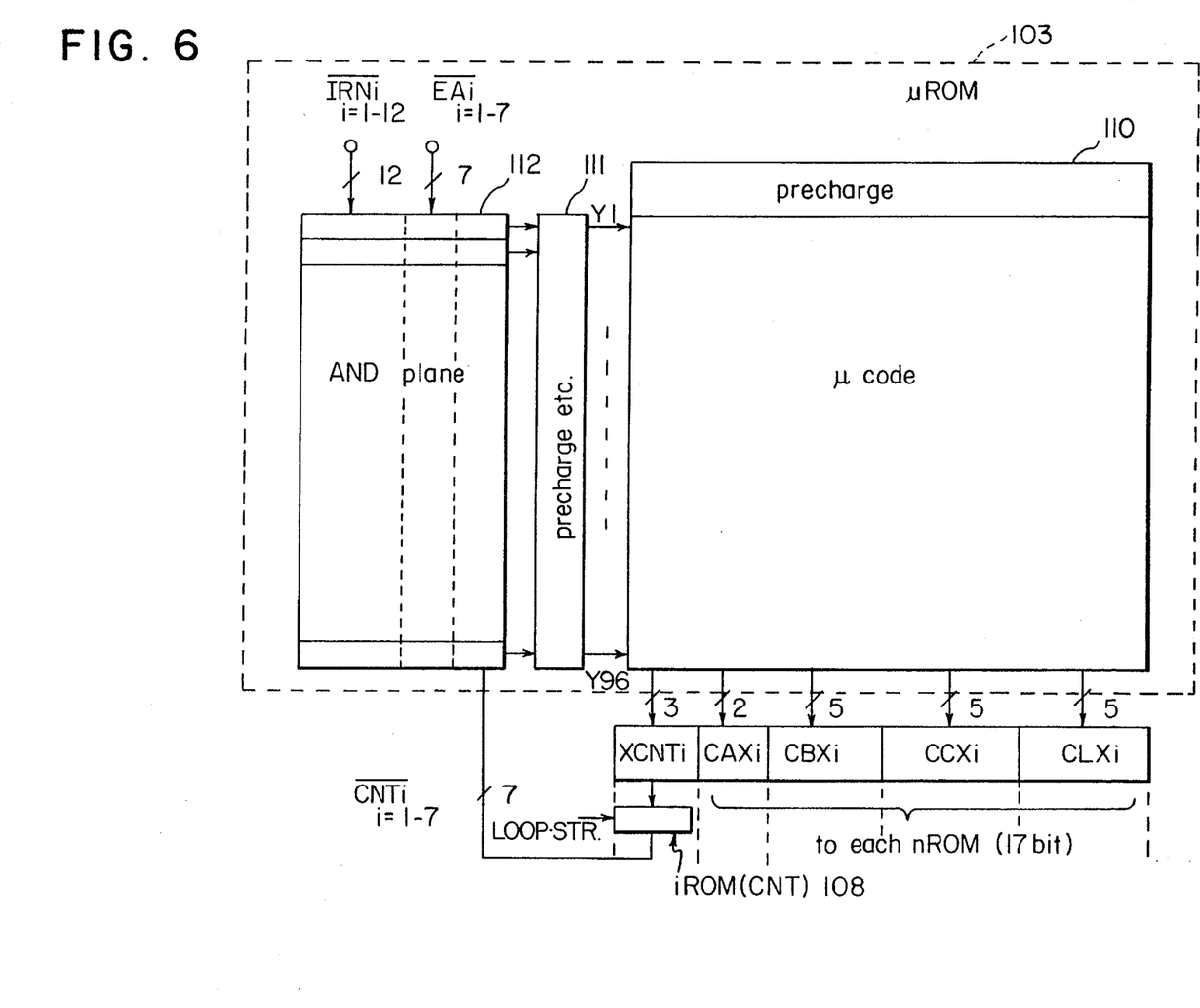
FIG. 6 is a detailed drawing of the microprogram memory.

FIG. 6 illustrates a detailed diagram of the microprogram ROM 103 which corresponds to item 12 of FIG. 1. The microprogram ROM 103 includes a logical AND plane 112 which logically ANDs the various data words inputted from the first, second, and third address decoders, 101, 102, and 108, respectively. The data outputted from the logical AND plane 112 is inputted into a precharge buffer 111 which transfers the data to the actual memory 110 which stores the microcode so as to read out the proper microcode according to the inputted information. As illustrated in FIG. 6, the microcode is outputted to the various read only memories, 104–108.

Figure 7:
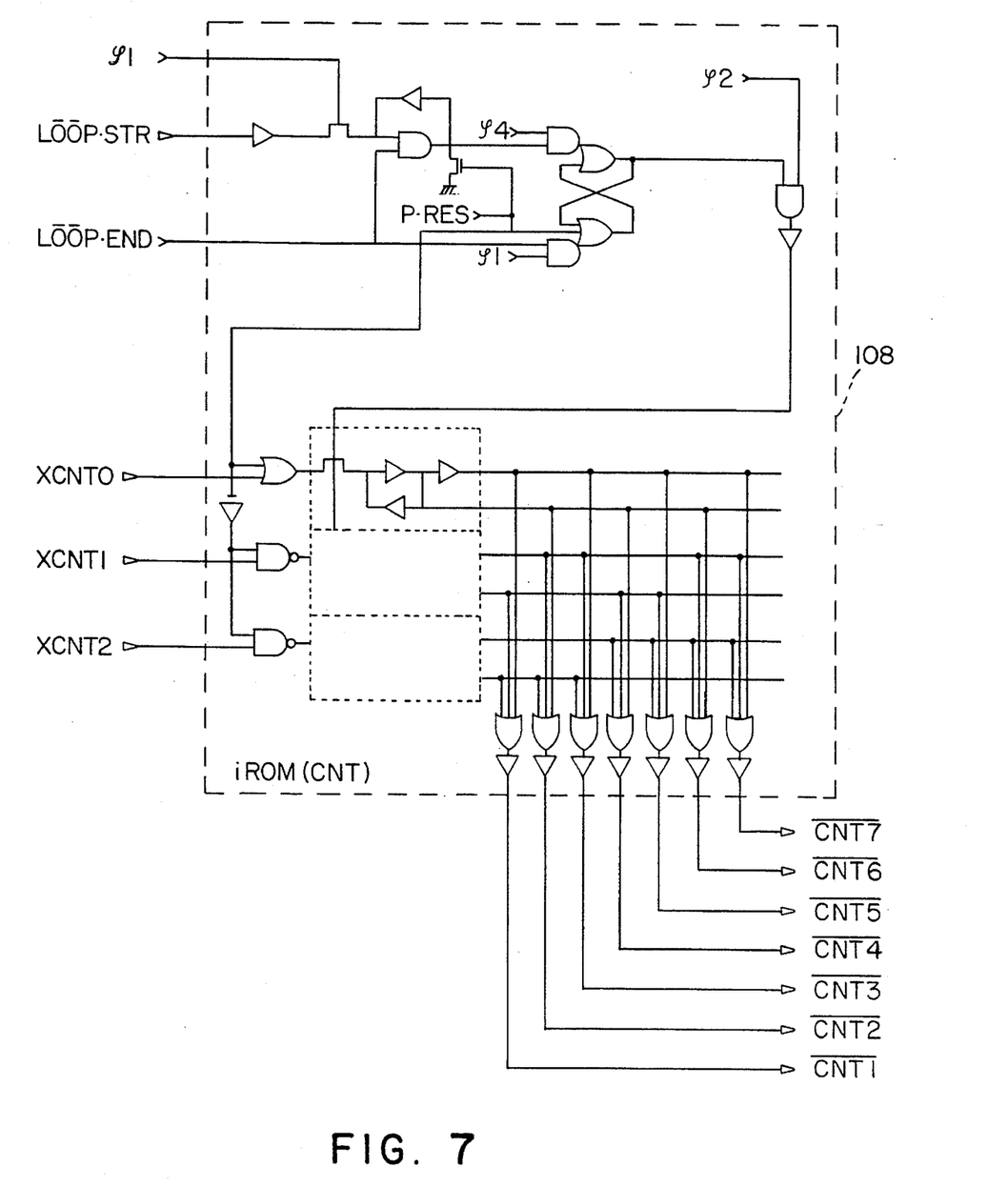
FIG. 7 is a detailed drawing of the third address decoder which generates the cycle value of the instruction.

FIG. 7 illustrates a detailed diagram of the third address decoder or third ROM 108. As illustrated in FIG. 7, the third address decoder 108 includes a control circuit which controls the timing of the decoding of the three inputted signals $XCNT_0$ $XCNT_1$ $XCNT_2$. This timing is in response to the input of clock signal 1, clock signal 2, and clock signal 4 and control signals loop start, loop end, and program reset. Upon decoding the input of these various signals, the timing for the generation of the output signals for the third address decoder 108 is controlled.

Figure 8:
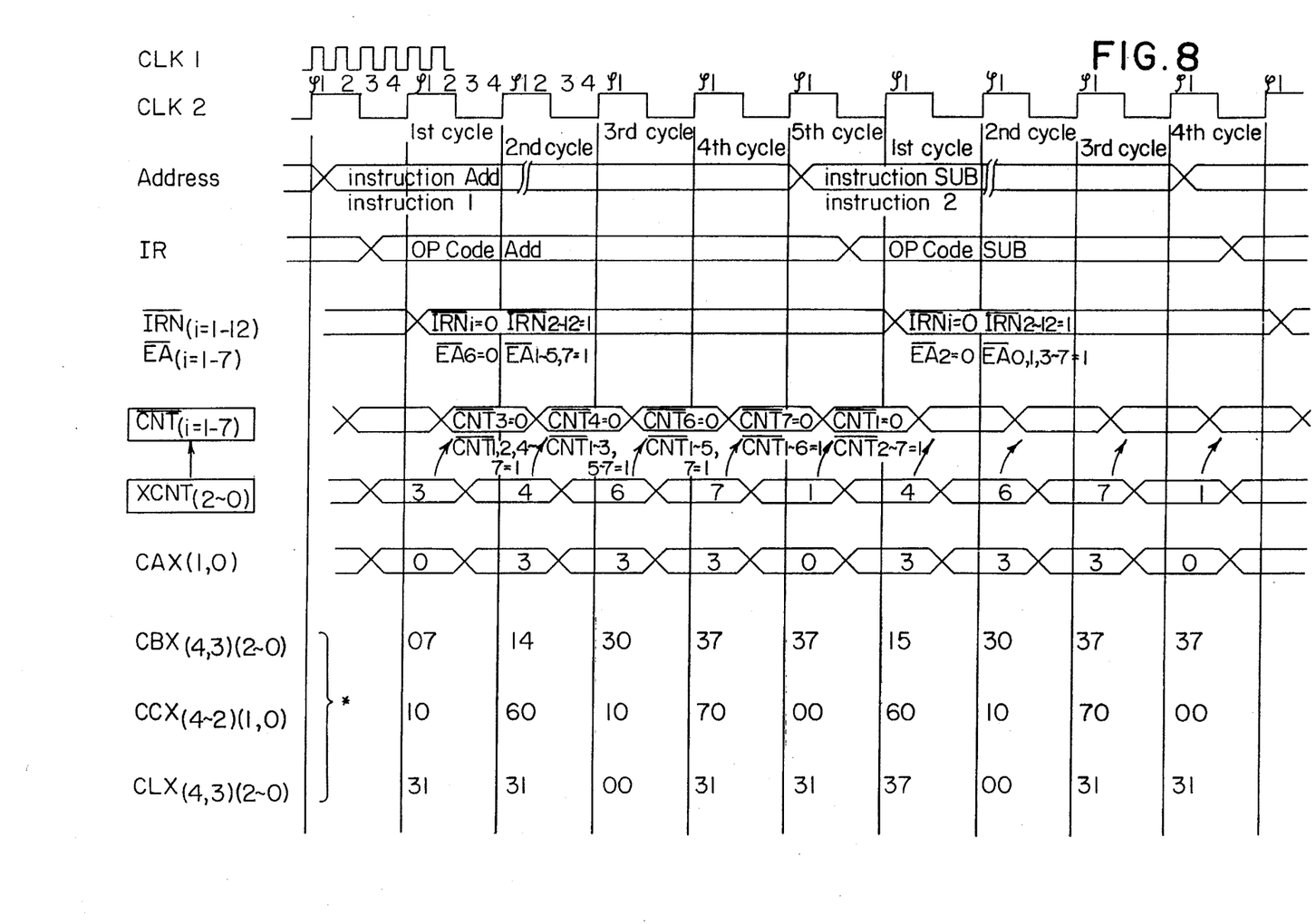
FIG. 8 illustrates a timing diagram for ADD instruction followed by a SUB instruction.

The operations of the present invention will now be briefly described utilizing the timing diagrams of FIGS. 2 and 8. More specifically, the following description of operation is mainly directed to the operations of the third address decoder 108. In this explanation, the example discussed will involve a case where an ADD instructions and a SUB instruction are to be successively executed by the microprocessor.

The ADD instruction and SUB instruction are derived from a microcode table for a particular instruction group. With respect to this example, the ADD instruction and the SUB instruction correspond to an instruction group designated as IRN=1. There are eleven other microcode tables corresponding to other instruction groups. Instruction group IRN=1 is outputted from the first decoder (ROM 101) as $\overline{IRN1}=0, IRN2, \sim \overline{IRN12}=1$ as shown in FIG. 5. These signals are inputted to the logic AND plane shown in FIG. 6.

When the ADD instruction is to be executed, $\overline{EA1}\sim\overline{EA5}=1, \overline{EA6}=0, \overline{EA7}=1$ are outputted from the second decoder (ROM 102) and $\overline{CNT1}=0, \overline{CNT2}\sim\overline{CNT7}=1$ are outputted from the third decoder (ROM 108) to the logic AND plane during the first cycle.

At this time, microcodes of CLXi=31, XCNTi=3, CAXi=0, CBXi=07, CCXi=10 are outputted from the microprogram ROM 103 for each field.

Thereafter, in the second cycle, the values from the first and second decoders do not change because the ADD instruction is in execution, and thus, the contents of the instruction register remains unchanged. However, the output value of the microcode XCNTi of the first cycle is converted into signals $\overline{CNT1}, \overline{CNT2}=1, \overline{CNT3}=0, \overline{CNT4}\sim\overline{CNT7}=1$ by the third decoder (ROM 108). These signals are then inputted to the logic AND plane. As a result, the microcode having a cycle value 3 (CNT=3) for the next (second) cycle is designated. Hereinafter, the third decoder (ROM 108) successively only inputs XCNTi from the microcode at each cycle until the ADD instruction is concluded. This inputted information designates the next address of the instruction, thereby establishing the microcode for the next cycle.

After executing the ADD instruction, when the SUB instruction is to be executed, $\overline{EA0}=1, \overline{EA1}=1, \overline{EA3}\sim\overline{EA7}=1$, and $\overline{EA2}=0$ are outputted from the second decoder (ROM 102) and $\overline{CNT1}=0, \overline{CNT2}\sim\overline{CNT7}=1$ are outputted from the third decoder (ROM 108) to the logic AND plane during the first cycle.

At this time, microcodes of CLXi=37, XCNTi=4, CAXi=3, CBXi=15, CCXi=60 are outputted from the microprogram ROM 103 for each field.

Thereafter, in the second cycle, the values from the first and second decoders do not change because the SUB instruction is in execution, and thus, the contents of the instruction register remains unchanged. However, the output value of the microcode XCNTi of the first cycle is converted into signals $\overline{CNT1}\sim\overline{CNT3}=1, \overline{CNT4}=0, \overline{CNT5}\sim\overline{CNT7}=1$ by the third decoder (ROM 108). These signals are then inputted to the logic AND plane. As a result, the microcode having a cycle value (CNT=4) for the next (second) cycle is designated. Hereinafter, the third decoder (ROM 108) successively only inputs XCNTi from the microcode at each cycle until the SUB instruction is concluded. This inputted information designates the next address of the instruction, thereby establishing the microcode for the next cycle.

The microprogram device of the present invention is not one which inputs the address of the microcode for the next cycle directly from the output of a microprogram memory through an address multiplexer.

What is claimed is:

1. A method for controlling a data path section provided in a CPU which utilizes a microcode stored in a microprogram memory, comprising the steps of:

(a) storing by microprogram memory means, microcodes corresponding to operations of the CPU;

(b) storing by instruction register means, an instruction code which is received from a data bus, said instruction code representing an instruction;

(c) generating by address generating means, an address to access said microprogram memory means from an output of said instruction register means;

(d) decoding by first address decoder means, a particular bit in said instruction code to determine an instruction type;

(e) decoding by second address decoder means, another particular bit in said instruction code to determine an addressing mode;

(f) designating by third address decoder means, a cycle value for accessing said microprogram memory means during each instruction cycle; and (g) outputting said microcode having a portion which is input to said third address decoder means, said microcode not being directly feedback into inputs of said microprogram memory means.

2. The method as claimed in claim 1, further comprising:

decoding the microcode, which includes a combination of microcode read from said microprogram memory means according to an address designation generated from said first, second, and third address decoder means and a bit in said instruction code, to control each block of the data path section.

3. The method as claimed in claim 1, wherein said microprogram memory means is accessed for each cycle of said instruction by a successive address designating method.

4. The method as claimed in claim 3, wherein a decoded portion of a previous cycle's output of said microprogram memory means constitutes a portion of an address component of a next cycle.

5. A microprogram control device for controlling a data path section provided in a CPU which utilizes a microcode stored in a microprogram memory by using a microprogramming method, comprising:

microprogram memory means for storing microcode, said microcode corresponding to operations of the CPU;

instruction register means for storing an instruction code which is received from a data bus, said instruction code representing an instruction;

address generating means, operatively connected to said instruction register means and said microprogram memory means, for generating an address, to access said microprogram memory means, from an output of said instruction register means;

said address generating means including,
first address decoder means for decoding a particular bit in said instruction code to determine an instruction type, and
second address decoder means for decoding another particular bit in said instruction code to determine an addressing mode; and third address decoder means, operatively connected to said microprogram memory means, for designating a cycle value for accessing said microprogram memory means during each instruction cycle;

said microprogram memory means having outputs for outputting said microcode, a portion of said microcode being inputted to said third address decoder means, said microcode not being directly feedback into inputs of said microprogram memory means.

6. The microprogram control device as claimed in claim 5, further comprising:

code decoding means, operatively connected to said microprogram memory means, for decoding the microcode, the microcode including a combination of microcode read from said microprogram memory means according to an address designation generated from said first, second, and third address decoder means and a bit in said instruction code, to control each block of the data path section.

7. The microprogram control device as claimed in claim 5, wherein said microprogram memory means is accessed for each cycle of said instruction by a successive address designating method wherein a decoded portion of a previous cycle's output of said microprogram memory means constitutes a portion of an address component of a next cycle.

8. The microprogram control device as claimed in claim 5, wherein the control device is provided on a semiconductor integrated circuit.

* * * * *